(12) United States Patent
Koivuniemi (10) Patent No.: US 7,159,191 B2
(45) Date of Patent: Jan. 2, 2007

(54) INPUT OF DATA

(75) Inventor: Tapio Koivuniemi, Oulu (FI)

(73) Assignee: Flextronics Sales & Marketing A-P Ltd., Port Louis (MU)

( * ) Notice: Subject to any disclaimer, the term of this patent is extended or adjusted under 35 U.S.C. 154(b) by 729 days.

(21) Appl. No.: 10/376,636

(22) Filed: Mar. 3, 2003

(65) Prior Publication Data

US 2004/0177179 A1  Sep. 9, 2004

(30) Foreign Application Priority Data

Mar. 3, 2003  (FI) .................................. 20030326

(51) Int. Cl.
*G06F 17/00*  (2006.01)
*G09G 5/00*  (2006.01)

(52) U.S. Cl. ...................... 715/827; 715/814; 715/864; 715/816; 345/168; 345/169; 345/173

(58) Field of Classification Search ................ 715/702, 715/827, 814, 864, 816, 532, 708; 345/156, 345/157, 168, 169, 173
See application file for complete search history.

(56) References Cited

U.S. PATENT DOCUMENTS 5,818,437 A * 10/1998 Grover et al. .............. 715/811

6,286,064 B1  9/2001 King et al.
2004/0153975 A1 * 8/2004 Williams et al. ............. 715/531
2004/0156562 A1 * 8/2004 Mulvey et al. .............. 382/310
2004/0201607 A1 * 10/2004 Mulvey et al. .............. 345/708
2005/0162395 A1 * 7/2005 Unruh ......................... 345/169

FOREIGN PATENT DOCUMENTS

EP          1035712 A2    9/2000
WO      WO 01/22697     3/2001

OTHER PUBLICATIONS

MacKenzie, et al., LetterWise: Prefix-based Disambiguation for Mobile Text Input, pp. 111-120, ACM 2001.*
Christina L. James and Kelly M. Reischel, Text Input for Mobile Devices: Comparing Model Prediction to Actual Performance, pp. 365-371, ACM 2001.*

* cited by examiner

*Primary Examiner*—Tadesse Hailu
(74) *Attorney, Agent, or Firm*—Young & Thompson (57) ABSTRACT

A data input method in user terminals having a limited-size keyboard with two different data input methods linked in such a way that toggling between the modes does not require from the user any special action during text input, since the change of mode is automatically performed as a result of keystrokes which are normal when a text is being edited.

18 Claims, 9 Drawing Sheets

| press | Multi-tap mode | Predictive text mode | Buffer |
|---|---|---|---|
| key 5 | OFF | ON | k |
| key 2 | OFF | ON | ja |
| key 7 | OFF | ON | kas |
| key 8 | OFF | ON | karu |
| key 3 | OFF | ON | kaste |
| key 5 | OFF | ON | kasvej |
| key 5 | OFF | ON | kartell |
| key 2 | OFF | ON | järvellä |
| NEXT key | OFF | ON | kartellä |
| NEXT keys | OFF | ON | järvellä |
| CLEAR key | ON | OFF, PT engine ON | kartell |
| CLEAR key | ON | OFF, PT engine ON | kasvej |
| CLEAR key | ON | OFF, PT engine ON | kaste |
| key 5 three times | ON | OFF | kastel |
| key 5 three times | ON | OFF | kasell |
| key 2 once | ON | OFF | kastella |
| SPACE key | OFF | ON | kastella (+space) |

| press | Multi-tap mode | T9 mode | Buffer |
|---|---|---|---|
| key 5 | OFF | ON | k |
| key 2 | OFF | ON | ja |
| key 7 | OFF | ON | kas |
| key 8 | OFF | ON | karu |
| key 3 | OFF | ON | kaste |
| key 5 | OFF | ON | kasvej |
| key 5 | OFF | ON | kartell |
| key 2 | OFF | ON | järvellä |
| NEXT key | OFF | ON | kartellä |
| NEXT key | OFF | ON | järvellä |
| CLEAR key | ON | OFF | järvell |
| CLEAR key | ON | OFF | järvel |
| CLEAR key | ON | OFF | järve |
| CLEAR key | ON | OFF | järv |
| CLEAR key | ON | OFF | jär |
| CLEAR key | ON | OFF | jä |
| CLEAR key | ON | OFF | j |
| CLEAR key | ON | OFF |  |
| key 5 twice | ON | OFF | k |
| key 2 once | ON | OFF | ka |
| key 7 four times | ON | OFF | kas |
| key 8 once | ON | OFF | kast |
| key 3 twice | ON | OFF | kaste |
| key 5 three times | ON | OFF | kastel |
| key 5 three times | ON | OFF | kastell |
| key 2 once | ON | OFF | kastella |

FIG. 1d PRIOR ART

| press | Multi-tap mode | Predictive text mode | Buffer |
|---|---|---|---|
| key 5 | OFF | ON | k |
| key 2 | OFF | ON | ja |
| key 7 | OFF | ON | kas |
| key 8 | OFF | ON | karu |
| key 3 | OFF | ON | kaste |
| key 5 | OFF | ON | kasvej |
| key 5 | OFF | ON | kartell |
| key 2 | OFF | ON | järvellä |
| NEXT key | OFF | ON | kartellä |
| NEXT keys | OFF | ON | järvellä |
| CLEAR key | ON | OFF, PT engine ON | kartell |
| CLEAR key | ON | OFF, PT engine ON | kasvej |
| CLEAR key | ON | OFF, PT engine ON | kaste |
| key 5 three times | ON | OFF | kastel |
| key 5 three times | ON | OFF | kasell |
| key 2 once | ON | OFF | kastella |
| SPACE key | OFF | ON | kastella (+space) |

INPUT OF DATA

FIELD OF THE INVENTION

The present invention generally pertains to the manual input of data and more specifically, to the manual input of text data from a limited-size keyboard, such as that of a hand-held device too small for a full-sized keyboard.

BACKGROUND OF THE INVENTION

Small portable equipment such as mobile phones and Personal Digital Assistants (PDAs) have a limited-size keyboard, i.e. the keyboard has a smaller number of keys than a standard QWERTY-keyboard or a 104-key PC-keyboard. Of necessity a limited-size keyboard assigns multiple characters to each key.

Figure 1:
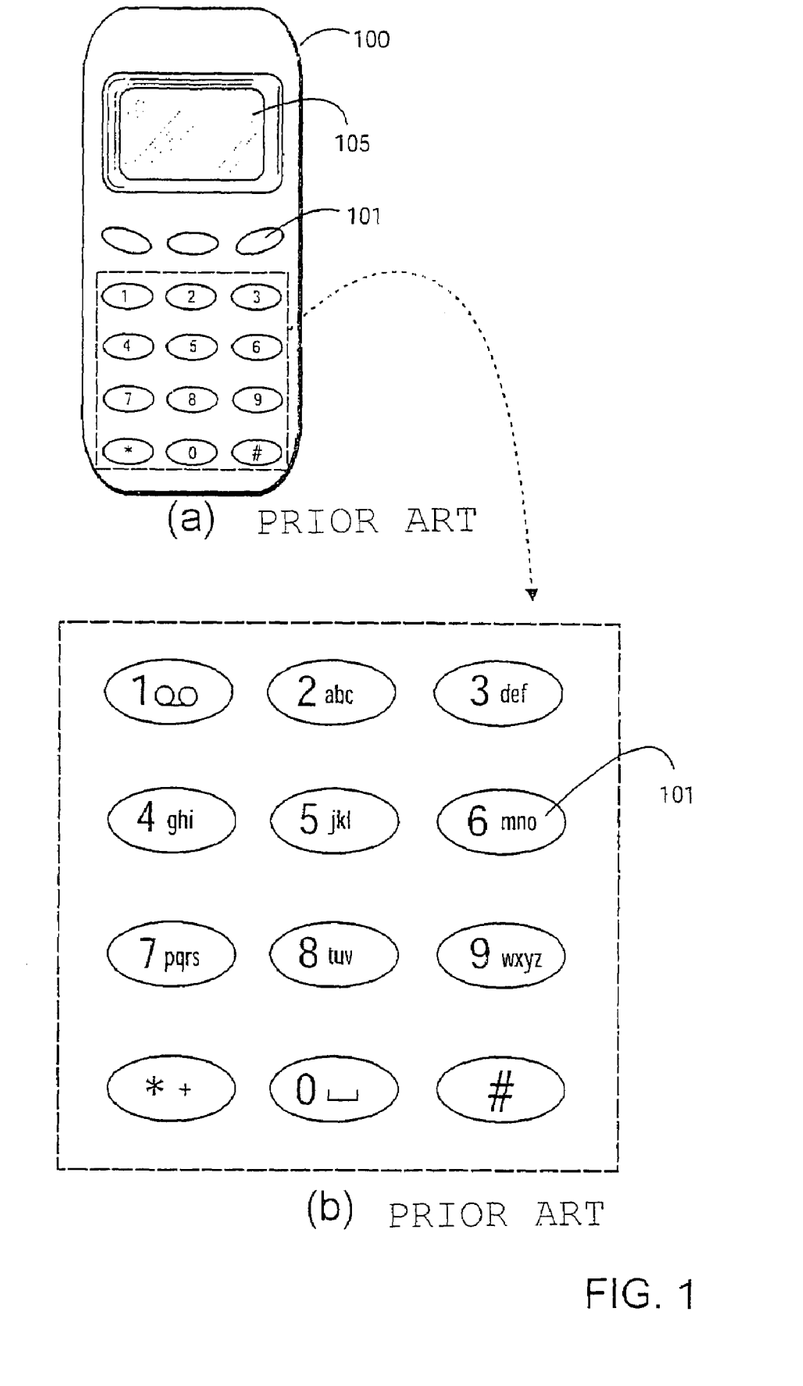
FIG. 1a–d illustrates a known text input method.

FIG. 1a shows a mobile phone 100 having fifteen keys 101 arranged in three columns and five rows on its front surface. At least some of the keys are multi-tap keys. An individual multi-tap key has multiple contents, i.e. different characters are displayed depending on the number of taps made on the same multi-tap key.

The traditional way of inputting a word is that each letter in the word is input one at a time in a particular edit-word mode or a multi-tap text input mode. Hereafter, the multi-tap text input mode will simply be referred to as the multi-tap mode, which is used with mobile phones for entering what is termed a "short message" (SMS). In this mode a multi-tap key must be pressed one or more times until the desired number, letter, or other character or symbol is displayed.

FIG. 1b is an enlargement of a portion of the limited-size keyboard that is shown in FIG. 1a.

The word TEXT is entered in the multi-tap mode (also called ABC mode) according to the multi-tap text entry technique in the following way. The letter T is input by pressing the numeric key 8 once, the letter E by pressing the numeric key 3 twice, the letter X by pressing the numeric key 9 twice, and the letter T is entered by pressing the numeric key 8 once. Digits are input in a similar way. For example, the digit sequence 5910 is entered so that the numeric key 5 is pressed four times, key 9 is pressed five times, key 1 is pressed seven times, and key 0 is pressed two times. Thus the selection of a certain letter requires one to five consecutive taps on the same key, and the selection a certain number requires two to seven consecutive taps on the same key.

The keys are often also assigned a plurality of special characters. As an example, special characters in some European languages are as follows: Finnish and Swedish: å, ä, ö; Danish: å, æ, ø; and French: à, â, ç, è, ë, í, ì, ô, ù, û, ü, œ. The selection of a certain special character usually requires at least five key taps.

A major drawback with the above method is that the writing of a short message is slow, difficult, and frustrating.

In publication WO 01/22697 an accessory keyboard is presented as a solution for devices having a limited-size keyboard. The accessory keyboard comprises the QUERTY alphanumeric keyboard and a detachable connector which can be connected to the accessory connector of the portable radio telephone. This solution has several drawbacks. First, the accessory keyboard enlarges the size of the telephone. Second, one must remember to take along the accessory keyboard. Third, the acquisition of the accessory causes the user extra costs.

Predictive text input methods have been developed for entering text in equipment having a limited-size keyboard. The aim of these methods is to minimize the number of keystrokes required for entering text, i.e. to enable text entry using only one keystroke per key regardless of how many characters have been assigned to each key. The T9® text input method developed by Tegic Communications Inc. is one example of the predictive text input method. The idea of the method is described briefly in the following.

Figure 1C:
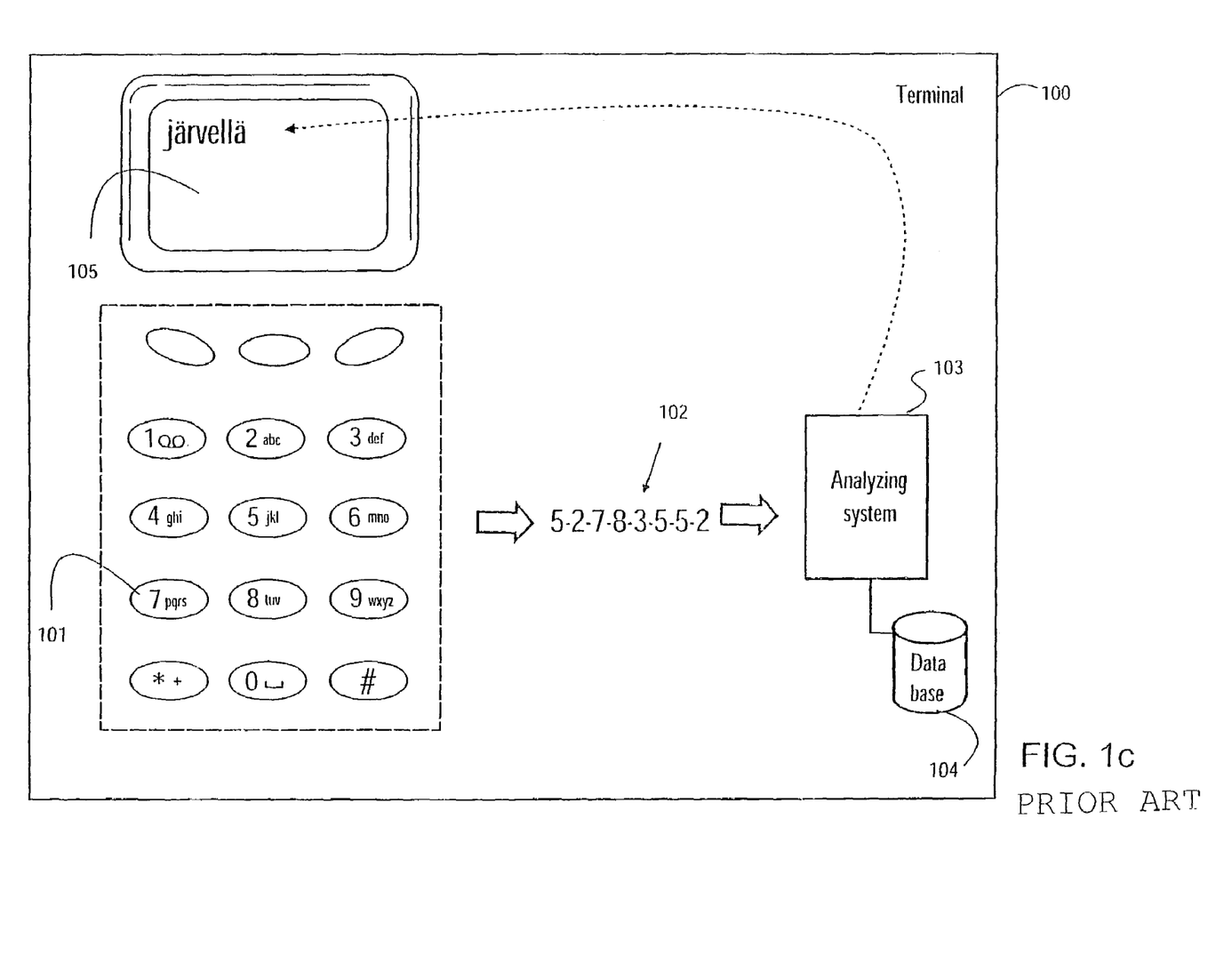
Figure 1D:
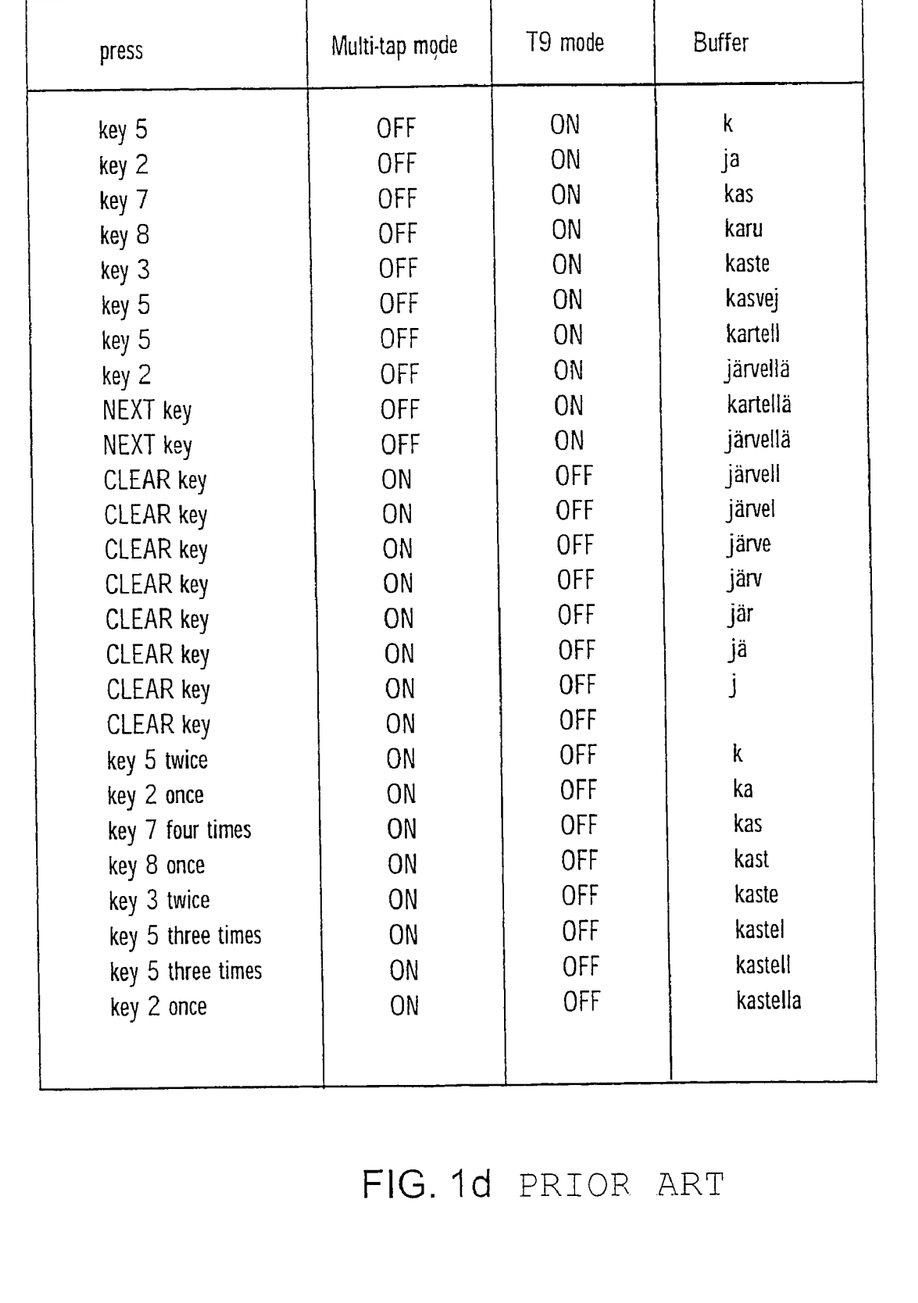

FIG. 1c–d illustrate how the T9 text input method works.

It is assumed that the T9 text input method, i.e. the predictive text input method, is initially active and that the Finnish dictionary is in use. The main blocks in FIG. 1c are multi-tap keys 101, the T9 analyzing system 103 including the T9 engine, the T9 database 104, a display 105, buffers (not shown), and the possibility of changing the T9 text input mode, hereafter termed the T9 mode, to the multi-tap mode (ABC mode) and vice versa.

In FIGS. 1c and 1d it is assumed that initially a buffer in the T9 text input mode is empty.

In the T9 mode the keystroke sequences are transformed into word predictions. Eight key taps are needed for a word having eight letters. Thus when a user wants to enter the Finnish word "kastella", the numeric keys 5, 2, 7, 8, 3, 5, 5, and 2 are pressed once consecutively. The T9 text input system analyzes all the letters after each keystroke, and the T9 engine tries to create a word. The idea in the T9 text input method is that the user need not worry about what is displayed until the word is completed. In this example the word predicted after the completed keystroke sequence 5-2-7-8-3-5-5-2 102 is "järvellä".

It is usual that more than one word shares the same keystroke sequence. Here the completed word differs from the desired word because the word "kastella" was not considered the most frequently used word.

However, if the word created is not the intended word, the user has the possibility of requesting a list containing other possible words, scrolling the list on the screen, and selecting the desired word by pressing the selection key. If the right word has not been deposited in the T9 database dictionary, it will also be missing from the choices in the list. In that case the word can be added to the database 104 manually by using the multi-tap text entry technique described above.

FIG. 1d is a table for illustrating in detail the keystrokes needed for the word "kastella".

The first column shows the action, the second and third indicate the status of the multi-tap mode and the T9 mode, respectively, and the fourth column shows the content of the text buffer after each action. The content of the text buffer is also immediately displayed.

At the beginning the T9 mode is active (ON) and the multi-tap mode is inactive (OFF). The word "kastella" has eight letters which are input by pressing the keys shown in the first eight lines in the first column of the table. Because the completed word is wrong, the NEXT key is used to cycle through the other word options. In this case, the option is "kartellä", which is against the Finnish phonetic rule of vowel harmony. Another tap of the NEXT key brings again the word "järvellä". The word "kastella" is missing from the mobile dictionary, and it must be added using the multi-tap mode. In some cases the mode may change automatically from the T9 mode to the multi-tap mode, or alternatively the user changes the mode.

When the multi-tap mode is set as active (ON), the T9 mode is simultaneously set as inactive (OFF), i.e. the T9 mode does not predict the words.

One drawback is that the user must first delete the complete word in the text buffer, clearing it letter by letter from the end of the word. This requires eight keystrokes of the CLEAR key. After the T9 mode is changed to the multi-tap mode, the word must be added by pressing numeric keys in the following way: key 5 twice, so that the content of the text buffer is "k"; key 2 once, so that the content of the text buffer is "ka"; key 7 four times, so that the content of the text buffer is "kas"; key 8 once, so that the content of the text buffer is "kast", key 3 twice, so that the content of the text buffer is "kaste", key 5 three times, so that the content of the text buffer is "kastel", key 5 three times, so that the content of the text buffer is "kastell" and key 2 once, whereupon the content of the text buffer is finally the desired word "kastella". The word can now be saved in the dictionary, i.e. in the database 104, from which it can be retrieved in T9 mode when needed. After saving the word, the user must return to the T9 mode by pressing a mode change key. At least 35 keystrokes were needed to type the word "kastella" having 8 letters. This total does not include keystrokes needed for mode changes and saving.

It is clear that writing messages can be frustrating and slow if the text comprises several words needing an operation like the one described above. How easy it is to write with the T9 text input method also depends on the structure of the language used.

The structure of the Finnish language differs considerably from other European languages. It does not belong to the Indo-European language group to which Swedish, English, German, French, and Russian belong, for example. Typical to the Finnish language is possessive suffixes that are added to the end of a stem and an abundance of case endings and prefixes. Problems may arise especially when inflectional forms of Finnish are used with the T9 text input method.

SUMMARY OF THE INVENTION

It is an aim of the present invention to provide a new kind of text entry method by means of which the text entry is more user-friendly and where the number of keystrokes needed is minimized. This also has the direct consequence that the text entry is faster than present text entry methods.

This is achieved with a solution as defined in the independent claims.

The idea is to implement the text input method in a terminal in such a way that the predictive text input feature can also be used with the multi-tap mode (ABC mode) in such cases where the desired word does not appear in the database dictionary.

The objective of this invention is achieved by permitting the toggling of the predictive text input mode and the multi-tap mode (ABC mode) by means of an intermediate mode. No special actions are required from the user in order to change the mode from one mode to another. The change of mode is automatically performed as the result of keystrokes which are normal when a text is edited. Examples of mode-changing keystrokes are one tap of the CLEAR key for correcting a typing error by removing the last character typed or one tap of the SPACE key before starting the next word.

With this method certain predefined keys, e.g. the CLEAR, SPACE, SAVE or an alphanumeric key, are assigned multiple functions. The first is the key's normal function, i.e. the CLEAR key deletes a character and the SPACE key adds a space. Additional functions are that simultaneously with the normal function the current mode is changed to another mode and that the keystroke sequence in the current buffer is generated to another buffer, for example.

BRIEF DESCRIPTION OF THE DRAWINGS

The invention is described more closely with reference to the accompanying drawings, in which.

DETAILED DESCRIPTION OF THE INVENTION

The method of the invention as adapted for use in a GSM (Global System for Mobile communications) mobile phone is examined in the following. However, the invention is not restricted to use in GSM mobile phones, but can also be used in other portable user terminals such as PDAs having a limited-size keyboard. A requirement is that the predictive text input technology is embedded in the terminal used.

Thus characters may be input into a user terminal which is adapted to operate in the first mode, i.e. the predictive text mode using the one-touch entry technique or in the second mode, i.e. the multi-tap mode where a character is input by pressing a key one or multiple times.

The known predictive text mode and the multi-tap mode are linked in such a way that toggling between the modes does not require any special action from the user during text input, since the change of mode is automatically performed as the result of keystrokes which are normal when a text is being edited. Examples of such keystrokes are a tap of the CLEAR key when the word is wrongly typed or a tap of the SPACE key after a completed word or punctuation. Thus these keys, as well as other multi-tap keys, have additional functions, which will be described in detail in the following. It should be noted that although on some mobile terminals the CLEAR key is termed DELETE, its normal function is exactly the same.

Figure 2:
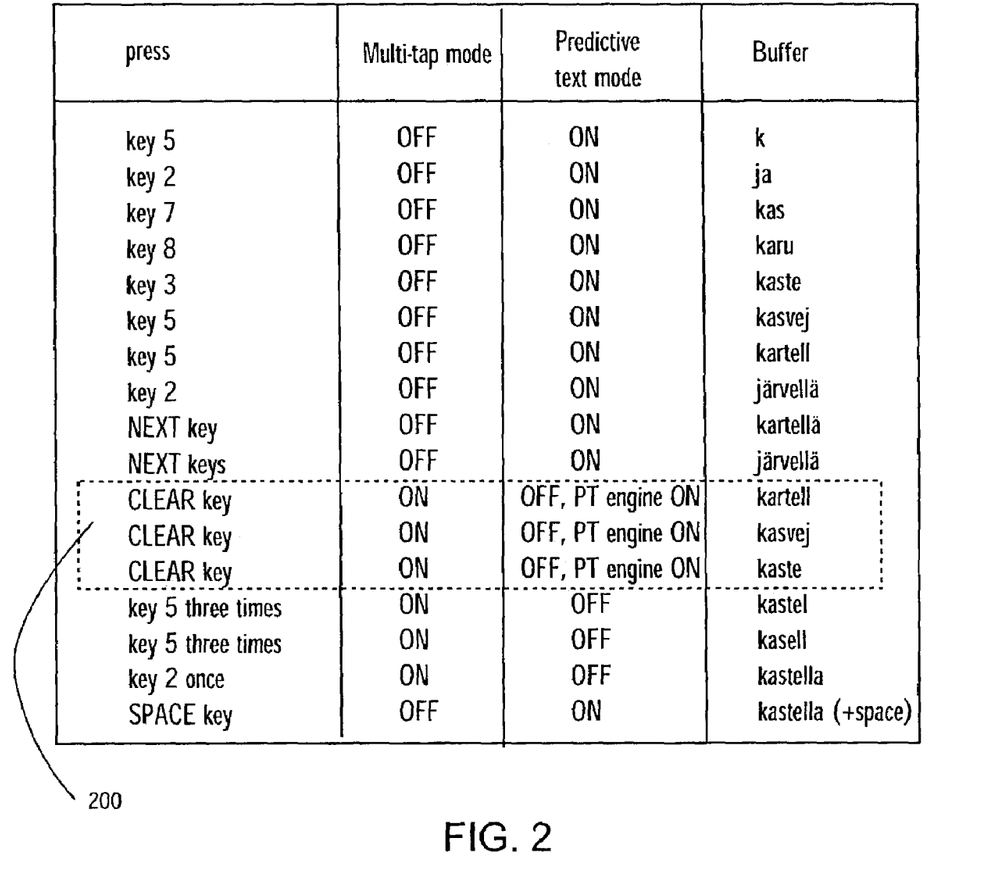
FIG. 2 is an example of the first embodiment of the invention.

FIG. 2 illustrates the implementation of the first embodiment of the invention. As an example, the same word is input into the mobile terminal as above in FIG. 1.

It is assumed that the predictive text mode is set initially as active (ON) and that the Finnish dictionary is in use. The multi-tap mode is inactive (OFF). The initial state of the text buffer is empty. The user types the word "kastella" by pressing consecutively the numeric keys 5, 2, 7, 8, 3, 5, 5, and 2. After each tap the content of the text buffer changes as follows: "k", "ja", "kas", "karu", "kaste", "kasvej", "kartell", and "järvellä", as seen in FIG. 2. The content of the text buffer is displayed.

Because the word displayed is not the intended word, the user presses the NEXT key to see additional word choices relating to the same keystroke sequence. In this case the next word in the list is "kartellä". When the user presses the NEXT key a second time, the displayed word is "järvellä" again.

Then the user presses the CLEAR key once in order to delete the last letter of the word. However, the CLEAR key contains multiple functions, i.e. in response to pressing the CLEAR key in the predictive text mode, the last letter of the word in the text buffer is deleted, the multi-tap mode is activated, and the predictive text mode is inactivated simultaneously. However, although the predictive text mode has been inactivated, the predictive text engine (PT engine in FIG. 2) remains active, i.e. the predictive text engine is used to create words in reverse for keystroke sequences in the multi-tap mode in the same way as in the predictive text mode. This mode is called an intermediate mode. It is to be noted that the term intermediate mode denotes the functions of intermediary linkage which permits automatic toggling between modes.

In the intermediate mode the fact that the predictive text engine is still active makes it possible to return to the previous predicted word forms in reverse order.

Thus in the intermediate mode, in response to the pressing of the CLEAR key, the last letter is deleted but at the same time the predictive text engine generates the most commonly used word relating to the keystroke sequence 5-2-7-8-3-5-5. In this case the word is "kartell". Because the word is not the intended word yet, the user presses the CLEAR key again, and the predictive text engine generates the word which relates to the keystroke sequence 5-2-7-8-3-5, i.e. the word "kasvej". Pressing the CLEAR key the third time renders the word "kaste" for the keystroke sequence 5-2-7-8-3. This word is partly the same as the intended word.

Now the user is able to finish the word by using the multi-tap technique. When the user presses the numeric key 5 three times to write the letter "l", the first tap of key 5 inactivates the predictive text engine, i.e. the predictive text engine does not predict words any more, and the multi-tap mode can be used in the usual way. In other words, the intermediate mode is changed to the multi-tap mode so that any character in the remaining word form can be added or deleted.

In the above example the letter "l" is typed by pressing the numeric key 5 three times, and "a" is typed by pressing key 2 once. When the word is completed, the user returns to the predictive text mode simply by pressing the SPACE key. In the multi-tap mode, the SPACE key has multiple functions. First, it adds a space after the word, and second, the mode is changed from the multi-tap mode to the predictive text mode.

The marked area 200, i.e. the intermediate mode in FIG. 2, is considered in more detail in the following.

Figure 3:
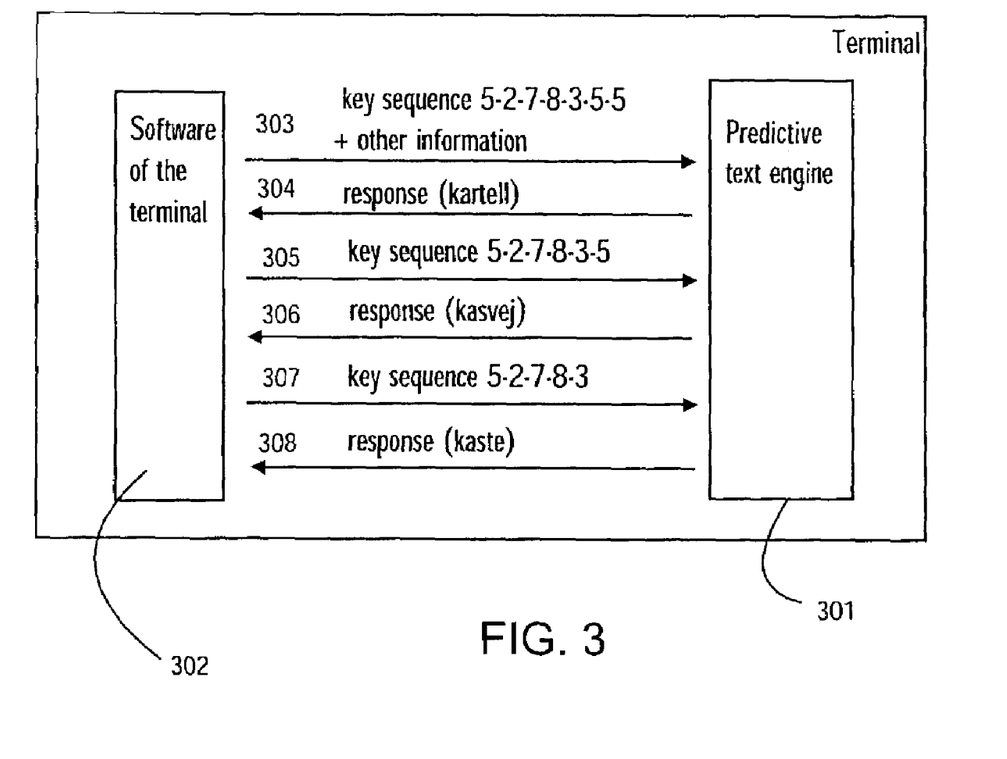
FIG. 3 illustrates the interaction between the software of the terminal and the predictive text engine.

FIG. 3 illustrates the interaction between the computer program recorded on memory of the terminal and the predictive text engine when the predictive text engine is used together with the multi-tap mode. Hereafter, the computer program will simply be referred to as the software.

The predictive text engine 301 is used to produce the word relating to the remaining keystroke sequence after the last letter "ä" is deleted from the wrong word "järvellä", i.e. the last digit 2 is deleted from the keystroke sequence 5-2-7-8-3-5-5-2. Thus, at stage 303 the software of the terminal 302 sends the keystroke sequence 5-2-7-8-3-5-5 to the predictive text engine 301. Also other necessary information can be given simultaneously, such as information about the pressed key, the dictionary, and the text buffer. The predictive text engine processes the information received, generates the word relating to the keystroke sequence, and sends the generated word "kartell" back (at stage 304), wherein the word is buffered in the text buffer and displayed. Likewise in response to the second pressing of the CLEAR key, the software of the terminal sends the keystroke sequence 5-2-7-8-3-5 (at stage 305) to the predictive text engine, which generates the word relating to the remaining keystroke sequence and at stage 306 returns the word "kasvej", which is buffered and displayed. Stages 307 and 308 are processed in the same way.

In general, in both of the modes (the predictive text mode and the intermediate mode) the pressing of the CLEAR key initiates multiple functions. On the one hand, in the predictive text mode, in response to the pressing of the CLEAR key the last letter of the word, i.e. the last digit of the current keystroke sequence in the text buffer is deleted and the most frequently used word relating to the remaining keystroke sequence is generated by the predictive text engine for the text buffer, the predictive text mode is inactivated, and the intermediate mode is activated. On the other hand, in the intermediate mode, in response to the pressing of the CLEAR key, the last letter of the current word, i.e. the current keystroke sequence, is deleted, and a new word which relates to the remaining keystroke sequence is generated by the predictive text engine. If the user then presses an alpha numeric key one or more times in order to add letters to the word prediction form remaining on display, the intermediate mode is automatically changed to the multi-tap mode, which remains until the SPACE key is pressed to start a new word.

The user need not worry about the mode changes because the modes are changed automatically as appropriate. An addition advantage is that the user must enter only the missing letters of the desired word when the first part of the word is already in the text buffer. In the examples here the text buffer is the same for each of the modes. However, each mode may also have a text buffer of its own, so that when the user presses a certain predetermined key while editing the text, the change between the modes is performed automatically and at the same time the content of the source text buffer is transferred to the target buffer. To help the user to complete the word with the right technique, the change of mode can be indicated by the highlighting of the word or the display of a specific figure, icon, character, or set of characters, for example.

Figure 4:
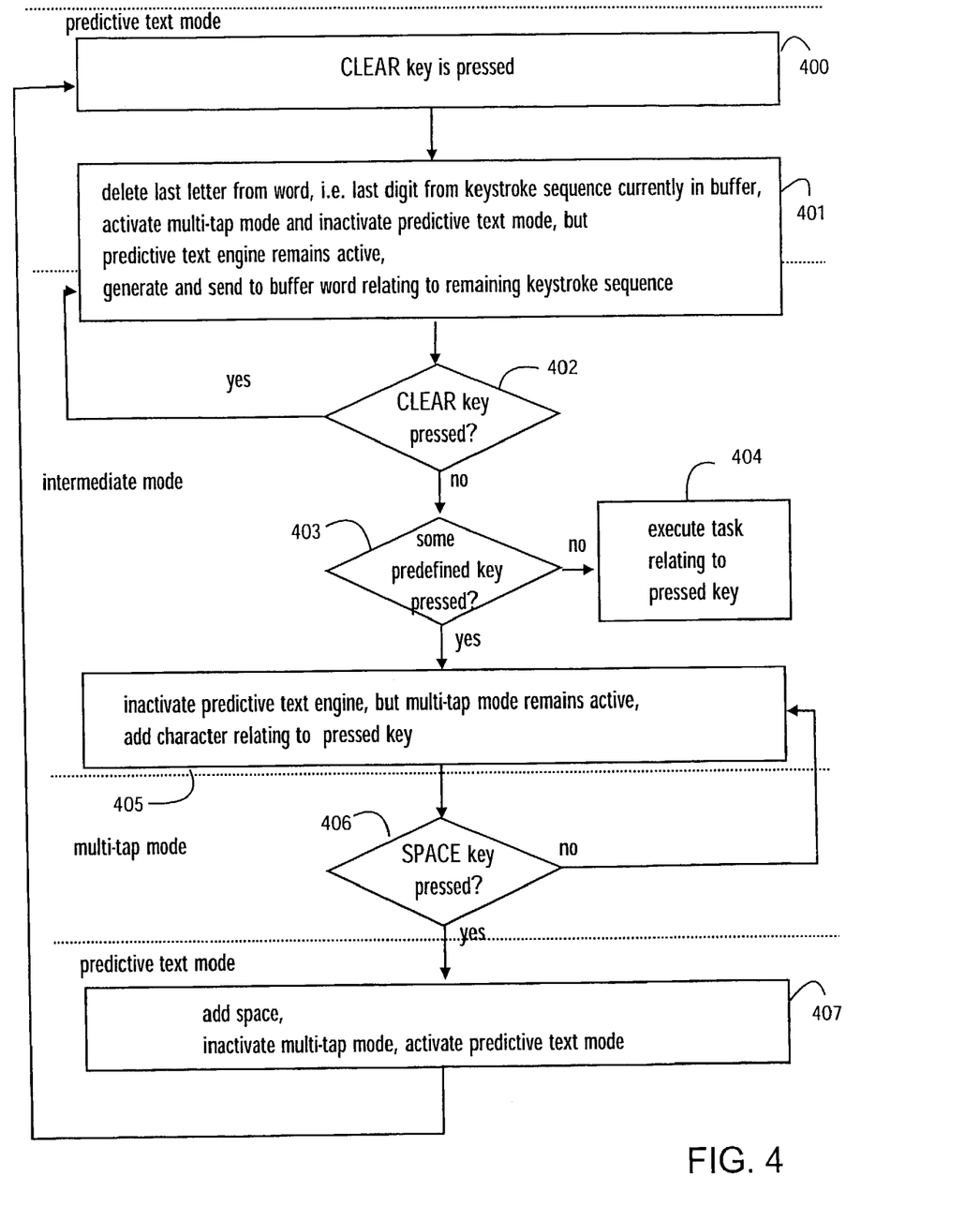
FIG. 4–6 are flowcharts showing some examples of the basic operation of the method.

FIG. 4 is the flowchart of the method in the first embodiment of the invention.

When the word completed is incorrect in the predictive text mode, the following stages are performed:

At stage 400 the CLEAR key is pressed. In response the last letter of the current word in the text buffer is deleted, i.e. the last digit from the keystroke sequence is deleted. Although the predictive text mode is inactivated, the predictive text engine still remains active, i.e. the intermediate mode has been activated. The predictive text mode engine generates the word prediction form relating to the remaining keystroke sequence, sends it to the text buffer, and accordingly the word prediction form is displayed, at stage 401.

If the CLEAR key is again pressed (stage 402), stage 401 is repeated except for the first step of an initial mode change. If some other predefined key (stage 403), such as an alphanumeric key, is pressed, the predictive text engine is inactivated, the multi-tap mode activated, and the desired character can be added to the word prediction form in the text buffer according to the multi-tap technique and displayed in the normal way, at stage 405. The word can be completed with the multi-tap text input method.

If the key pressed is not a predefined key, the normal task which relates to the key is executed, stage 404.

If the SPACE key is pressed in the multi-tap mode (stage 406) this means that the current word is finished and thus a space is added after the current word, the multi-tap mode is inactivated, and the predictive text mode is activated, at stage 407. Now the user is able to continue writing with the predictive text input method.

If the SPACE key is not pressed, writing can be continued with the multi-tap text input method.

If the CLEAR key is pressed in the predictive text mode, the stages described above are repeated.

Figure 5:
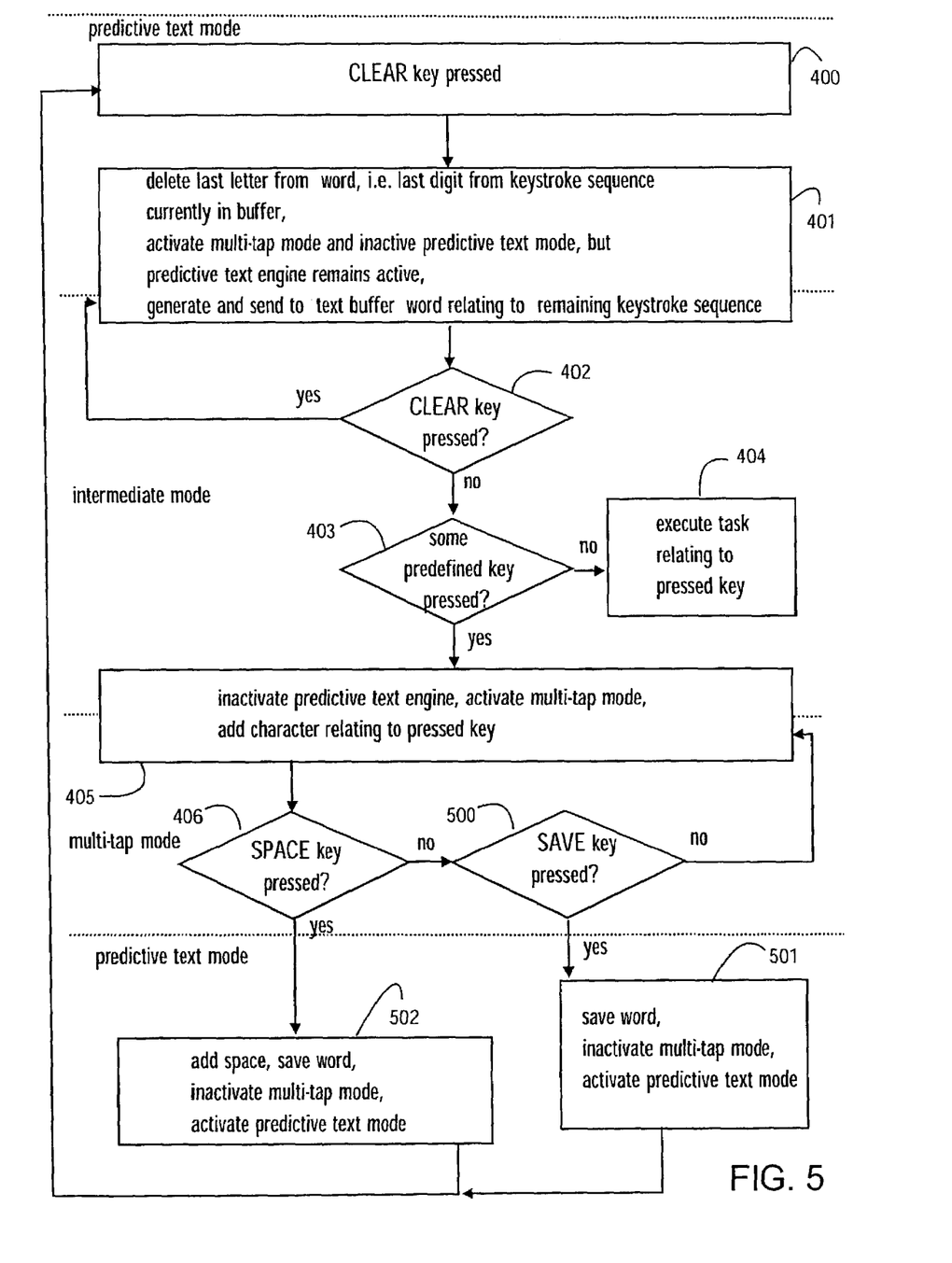

FIG. 5 is another example of the method as illustrated by a flowchart.

The stages 400–406 in FIG. 5 correspond to the stages 400–406 in FIG. 4.

Stage 502 otherwise corresponds to stage 407, but an additional feature is that the current word is also automatically saved in the database dictionary. However, if there is a punctuation mark at the end of the word the punctuation mark is not saved. An alternative is that the user then presses the SAVE key, whereby the word is added to the dictionary, at stage 501. In addition, the multi-tap mode is inactivated, and the predictive text mode is activated. In both cases the user is able to continue writing with the predictive text input method until the CLEAR key is pressed, at stage 501.

When the mode is changed from one to another, the user is informed of this by the display of a predictive text input symbol or "ABC" at the left corner of the display, or the word being edited is highlighted in different colors in different modes, for example. Thus, the user knows which text input method is in use.

The word entered as described above had eight letters. Still the method significantly reduces the number of keystrokes needed. When comparing this method with the known predictive text input method, it can be seen that at least 15 keystrokes fewer were needed. Of course, when an entire text message is considered, the difference in the amount of keystrokes needed would be more noticeable.

In a situation where the keystroke sequence entered does not match any word in the dictionary in the keystroke sequence analysis, the user is informed by an audio signal and/or by some symbol such as the ?-character. The user has the possibility of scrolling a list containing other choices for the same keystroke sequence in the same manner as in the known predictive text input method. If there is a word near to the desired word, it can be selected and edited as described above. This saves time in writing when part of the word has already been written.

The idea of the method is briefly described with the help of a flowchart in the following.

Figure 6:
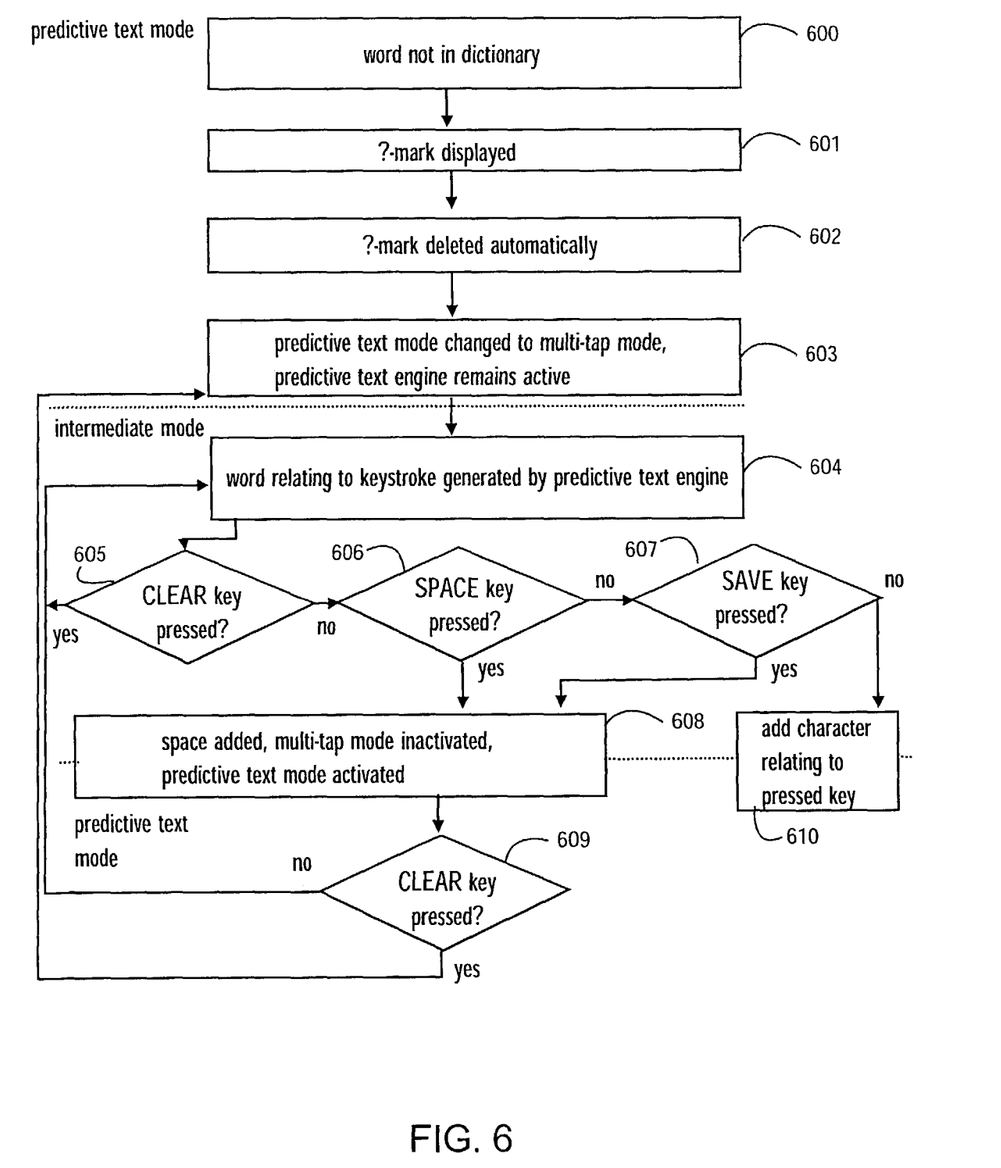

Referring now to a flowchart in FIG. 6, it is assumed that the user is using the predictive text mode but the intended word is not found in the dictionary used, stage 600. The user is informed by the ?-mark, at stage 601. Also an error signal can be used. The ?-mark is automatically deleted after a predetermined time (e.g. 2 seconds), and the predictive text mode is automatically changed to the intermediate mode where the predictive text engine can still be used in reverse, at stage 603.

The SPACE, SAVE and CLEAR keys in FIG. 6 (stages 604–610) have the same functions as in FIGS. 4 and 5.

The text input method can be implemented in any kind of user terminal having a limited-size keyboard, providing that the predictive text input technique is embedded in the terminal. The text input method is not dependent on the recording media. The software needed can also be implemented in a normal flash-memory or some other data storage means, for example.

Figure 7:
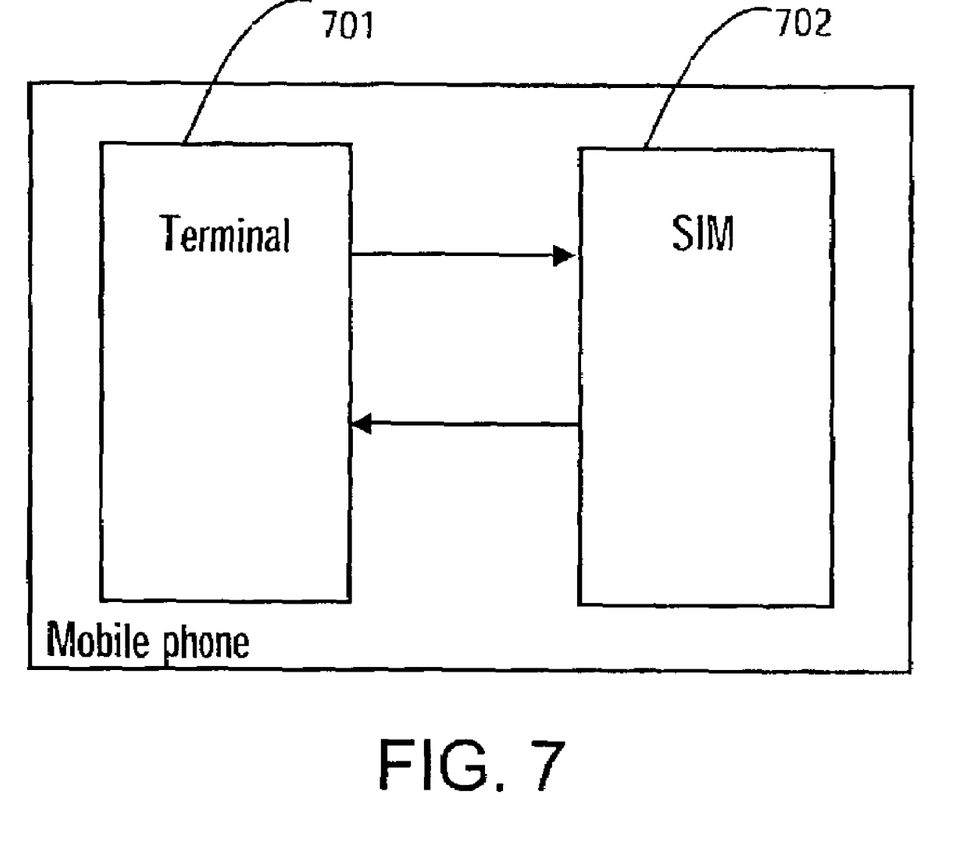
FIG. 7 shows the interaction between the SIM card and the terminal equipment in a mobile phone.

The functionality that supports the text input can either be installed directly into the mobile equipment (FIG. 7, 701) or in a module (FIG. 7, 702) that is inserted into the mobile equipment, e.g. a SIM card. The standardized SIM Application Toolkit provides mechanisms which allow applications existing in the SIM to interact and operate with any mobile equipment which supports the specific mechanisms required by the application.

Those skilled in the art may practice the principles of the present invention in other specific forms without departing from its spirit or essential characteristics.

Accordingly, the disclosed embodiments of the invention are merely illustrative and do not serve to limit the scope of the invention set forth in the claims.

For example, the terminal and the module that is inserted into the terminal can also be other than a mobile phone and a SIM card.

The application determines both the number of steps as described above and the accurate succession of operations relating to the steps. Of course, the keyboard used may be any kind, e.g. a physical keyboard or a virtual keyboard which is displayed on the terminal's display. However, it is required that the keyboard comprises a word prediction engine and at least one multi-tap key.

The predictive text input method and the multi-tap input method may also be used in the customary ways.

The invention claimed is:

1. A method for inputting characters into a terminal adapted to operate in a first mode using a one-touch entry technique, whereby when inputting characters of a word by pressing multi-tap keys, a word form prediction generated by a word predictive engine is displayed in response to each tap, and in a second mode using a multi-tap entry technique, whereby in response to each consecutive tap of a multi-tap key, one character from a group of characters assigned to the multi-tap key is displayed, the method comprising the steps of:

in response to the a deletion of a character a) the first mode is changed to an intermediate mode, which is a combination of the second mode and the word predictive engine, and b) a previous predicted word form is returned by the predictive engine, in response to a further deletion of a character from the previous predicted word form, a next previous predicted word form is returned by the predictive engine, and in response to pressing any key for an input of a character in the intermediate mode, said mode is changed to the second mode.

2. The method as in claim 1, wherein in response to the pressing of a SPACE key, the second mode is changed to the first mode and a space is added essentially simultaneously with a change of mode.

3. The method as in claim 1, wherein in response to the pressing of the SPACE key, the second mode is changed to the first mode, a space is added and a current word is saved essentially simultaneously with the change of mode.

4. The method as in claim 3, wherein the word is saved without any punctuation mark at an end of the word.

5. The method as in claim 1, wherein in response to the pressing of a SAVE key, the second mode is changed to the first mode and a current word is saved essentially simultaneously with the change of mode.

6. The method as in claim 1, wherein a user is informed of the change of mode by a highlighting of the current word and/or the display of a specific figure, icon, character, or set of characters.

7. The method as in claim 6, wherein in addition the user is informed of the change of mode by a voice or a tone.

8. A terminal which is adapted to operate in a first mode, in which terminal characters are input using a one-touch entry technique, whereby when inputting characters of a word by pressing multi-tap keys, a word form prediction generated by a word predictive engine is displayed in response to each tap, and in a second mode, in which characters are input by using a multi-tap entry technique, whereby in response to each subsequent tap of a multi-tap key, one character from a group of characters assigned to the multi-tap key is displayed, the terminal is further adapted to a) change, in response to deletion of a character, the first mode to an intermediate mode, which is a combination of the second mode with the word predictive engine, and return a previous predicted word form by the predictive engine, b) return a next previous predicted word form by the predictive engine in response to a further deletion of a character from the previous predicted word form, and c) change the intermediate mode to the second mode in response to the pressing of any key for input of a character.

9. The terminal as in claim 8, wherein the terminal is further adapted to change the mode from the second mode to the first mode in response to the pressing of a SPACE key, wherein a space is added essentially simultaneously with a change of mode.

10. The terminal as in claim 8, wherein the terminal is further adapted to change the mode from the second mode to the first mode in response to the pressing of the SPACE key, wherein a space is added and a current word is saved essentially simultaneously with the change of mode.

11. The terminal as in claim 10, wherein the terminal is further adapted to save the word without any punctuation mark at an end of the word.

12. The terminal as in claim 8, wherein the terminal is further adapted to change the second mode to the first mode in response to the pressing of a SAVE key, wherein the current word is saved essentially simultaneously with a change of mode.

13. The terminal as in claim 8, wherein a keyboard used for inputting characters is a physical keyboard or a virtual keyboard displayed on the terminal's display.

14. A computer program recorded on memory or data storage means to carry out a method for inputting characters into a terminal operating in a first mode using a one-touch entry technique, whereby when inputting the characters of a word by pressing relevant multi-tap keys once, a word prediction form generated by a word predictive engine is displayed in response to each pressing and in a second mode, whereby characters are input using a multi-tap entry technique, so that, in response to each consecutive tap of a multi-tap key, one character from a group of characters assigned to the multi-tap key is displayed, said program recorded on said memory or data storage means a) changing, in response to deletion of a character, the first mode to an intermediate mode, which is a combination of the second mode with the word predictive engine, and returning a previous predicted word form by the predictive engine, b) returning a next previous predicted word form by the predictive engine in response to a further deletion of a character from the previous predicted word form, and c) changing an intermediate mode to the second mode in response to the pressing of any key for input a character.

15. The computer program as in claim 14, wherein in response to the pressing of a SPACE key the second mode is changed to the first mode and a space is added essentially simultaneously with a change of mode.

16. The computer program as in claim 14, wherein in response to the pressing of a SPACE key, the second mode is changed to the first mode, a space is added and a current word is saved essentially simultaneously with a change of mode.

17. The computer program as in claim 16, wherein the current word is saved without any punctuation mark at an end of the word.

18. The computer program as in claim 14, wherein in response to the pressing of the SAVE key, the second mode is changed to the first mode and the current word is saved essentially simultaneously with the change of mode.

* * * * *